UNITED STATES PATENT OFFICE.

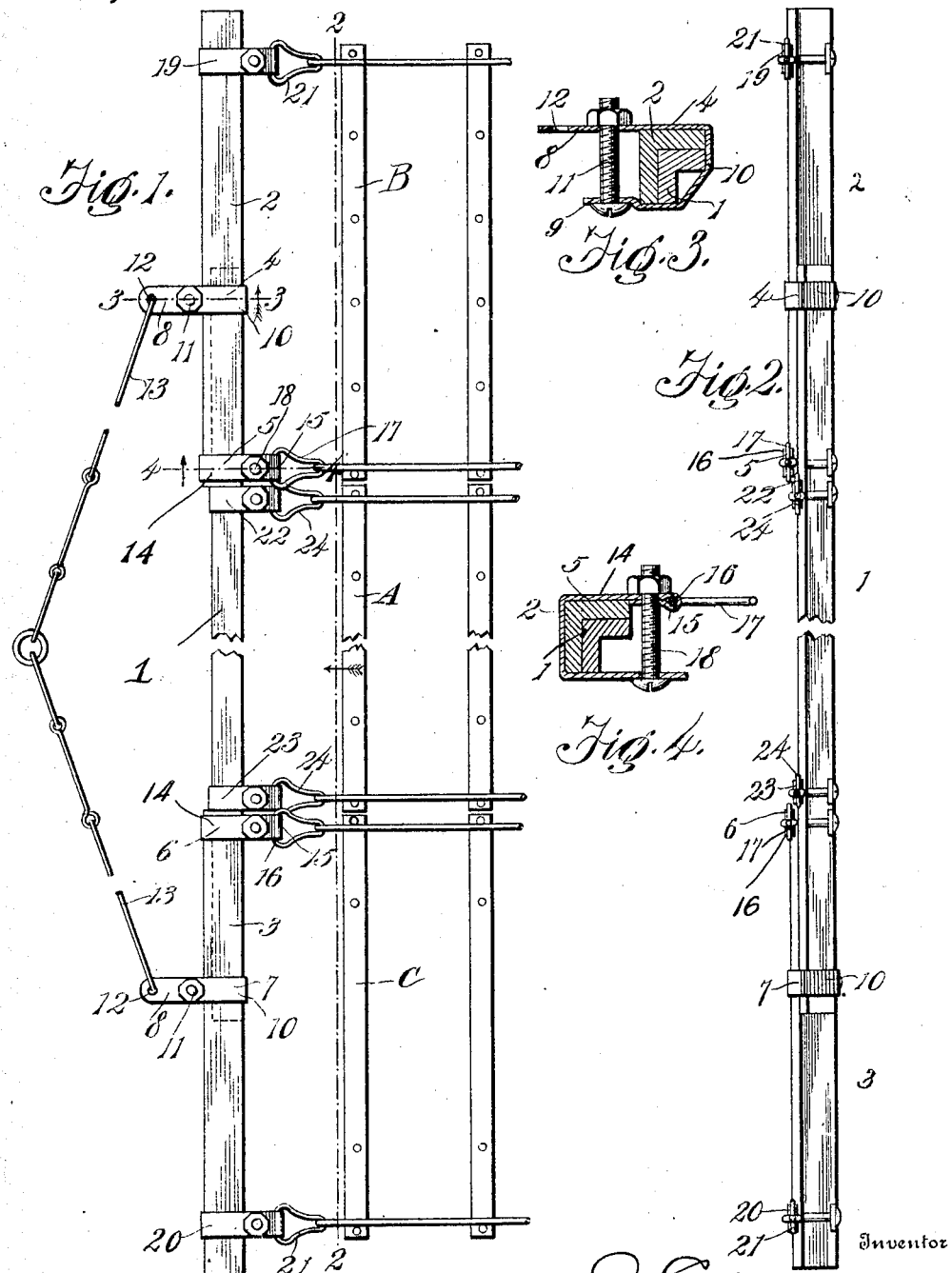

JOHN CLAYTON JORDAN, OF CAMDEN, ILLINOIS.

ADJUSTABLE EVENER FOR HARROWS.

No. 916,560.　　　　Specification of Letters Patent.　　Patented March 30, 1909.

Application filed June 6, 1908. Serial No. 437,140.

*To all whom it may concern:*

Be it known that I, JOHN CLAYTON JORDAN, a citizen of the United States, residing at Camden, in the county of Schuyler and State of Illinois, have invented certain new and useful Improvements in Adjustable Eveners for Harrows, of which the following is a specification, reference being had to the accompanying drawings.

My invention relates to improvements in adjustable draft bars or eveners for harrows and the like.

The object of the invention is to provide a simple and practical device of this character which may be readily adjusted so that either two or three harrow sections may be connected together and drawn by the one team.

With the above and other objects in view the invention consists of the novel features of construction and the combination and arrangement of parts hereinafter fully described and claimed and illustrated in the accompanying drawings, in which—

Figure 1 is a plan view of my invention showing it extended for connecting three harrow sections; Fig. 2 is a longitudinal section taken on the plane indicated by the line 2—2 in Fig. 1; and Figs. 3 and 4 are transverse sectional views taken respectively on the planes indicated by the lines 3—3 and 4—4 in Fig. 1.

My improved evener consists of three members 1, 2, 3, slidably engaged with each other and preferably constructed of angle metal. The intermediate member 1 has its ends arranged to slide within the end members 2, 3 and it is adjustably secured to the latter by four clamps 4, 5, 6, 7. The inner clamps 5, 6 are fixed to the inner ends of the members 2, 3, while the outer clamps 4, 7 are longitudinally slidable upon said members so that they may be positioned adjacent to the ends of the intermediate member 1 when the end members are adjusted upon the latter. Each of the clamps 4, 7 is in the form of a metal strap bent upon itself to surround one of said members and having a long arm 8 arranged upon the top of one of the end members, a short bottom arm 9 arranged upon the bottom of said member and an angular connecting portion 10 engaged with the rear edges of said member and the intermediate member 1, as shown more clearly in Fig. 3. The arms 8, 9 of the clamps 4, 7 extend forwardly and are formed with alined apertures to receive a clamping bolt 11 which is disposed close to the vertical front flange of the end member. The extended upper arms 8 of the clamps 4, 7 are formed with apertures 12 to receive the ends of a draft chain or connection 13 to which the draft animals are hitched. The clamps 5, 6 are similar to the clamps 4, 7 but they have their closed portions engaged with the front faces of the end members and their upper and lower arms extending rearwardly. The upper arm 14 of each of the clamps 5, 6 has its end bent downwardly and inwardly upon itself, as shown at 15 to provide a pivot eye 16 for an open link or loop 17. Each of said clamps 5, 6 has a clamping bolt 18 which passes through the lower arm of the clamp and also through its upper arm and the folded portion 15 of the latter, as clearly shown in Fig. 4 of the drawings. Clamps 19, 20, which are similar to the clamps 5, 6, are provided upon the end members 2, 3 adjacent to their outer ends and these clamps have open links or loops 21 similar to the links 17. The intermediate member 1 is provided with two slidably mounted clamps 22, 23, which are similar to the clamps 5, 6, 19, 20, and which carry loops or open links 24.

The use of the invention will be readily understood upon reference to Fig. 1, in which three harrow sections A, B, C, are shown arranged in parallel relation and connected by the evener. The central harrow section A is connected to the links 24 of the clamps upon the intermediate member 1, while the outer sections B, C are connected to the links 17, 21 of the clamps upon the end members 2, 3. When it is desired to use only two of the harrow sections, the central or intermediate one may be disconnected from the clamps 22, 23 and the latter may be moved toward each other to the center of the member 1, and by loosening the clamps 5, 6 the end members 2, 3 may be moved inwardly upon the member 1 until the two harrow sections connected to them are brought together or to the desired distance apart.

From the foregoing it will be seen that my invention provides an exceedingly simple, inexpensive, strong and durable evener which may be conveniently adjusted for either two or three sections of a harrow. Owing to the peculiar construction of its members and to the clamps which adjustably unite them they will be rigidly secured together in either their extended or telescoped position.

Having thus described my invention what I claim is:

1. A device of the character described comprising angle metal members slidably engaged with each other, clamps surrounding said members and adjustably connecting them, and means for connecting said clamps to harrow sections or the like.

2. A device of the character described comprising intermediate and end members slidably engaged with each other, clamps surrounding said members and adapted to secure them in adjusted positions, certain of said clamps being slidable upon the members, a draft connection attached to certain of said clamps, and means for connecting certain of said clamps to harrow sections or the like.

3. A device of the character described comprising angle metal members slidably engaged with each other, clamps uniting said members, said clamps being in the form of metal straps bent upon themselves and passed around said members in opposite directions and clamping bolts uniting the arms of said clamps to retain them upon the members and to hold the latter in adjusted positions.

4. A device of the character described comprising angle metal members slidably engaged with each other and clamps adjustably uniting them, said clamps comprising metal straps bent upon themselves to receive the members and having spaced arms, one arm being bent upon itself to provide an eye, clamping bolts passing through alining apertures in the arms of the clamps and in the bent ends of said arms, links arranged in the eyes upon the arms of the clamps and harrow sections connected to said links.

5. A device of the character described comprising angle metal members slidably engaged with each other and clamps surrounding said members for frictionally holding them together in longitudinally adjusted relation.

6. A device of the character described comprising members slidably engaged for longitudinal adjustment, clamps uniting said members, harrow sections connected to certain of said clamps, and a draft connection attached to certain of said clamps.

7. A device of the character described comprising members slidably engaged for longitudinal adjustment, clamps uniting said members and harrow sections connected to said clamps.

In testimony whereof I hereunto affix my signature in the presence of two witnesses.

JOHN CLAYTON JORDAN.

Witnesses:
   Roy Daly,
   Willie Daly.